United States Patent [19]

O'Rourke

[11] 3,826,936

[45] July 30, 1974

[54] FLEXIBLE SUBMERGIBLE ELECTRIC MOTOR

[75] Inventor: John C. O'Rourke, Bartlesville, Okla.

[73] Assignee: TRW, Inc., Cleveland, Ohio

[22] Filed: Dec. 6, 1973

[21] Appl. No.: 422,165

[52] U.S. Cl.............. 310/87, 310/112, 310/157, 417/424, 415/501
[51] Int. Cl. .............................................. H02k 5/12
[58] Field of Search ............ 415/501; 417/424, 423, 417/410, 361, 362; 310/87, 157, 75, 75 D, 112, 11 A, 66, 67; 64/3, 6, 7

[56] References Cited
UNITED STATES PATENTS

| | | | |
|---|---|---|---|
| 1,038,568 | 9/1912 | Gregg | 310/75 D |
| 1,819,626 | 8/1931 | Scofield | 310/112 |
| 1,960,484 | 5/1934 | Ekstromer | 310/112 |
| 2,098,958 | 11/1937 | Ekstromer | 310/112 |
| 2,219,318 | 10/1940 | Hoover | 310/87 |
| 2,240,569 | 5/1941 | Myers | 310/87 |
| 2,315,917 | 4/1943 | Arutunoff | 310/87 |
| 2,462,574 | 2/1949 | Wallace | 64/7 X |
| 2,712,436 | 7/1955 | McCune et al. | 64/7 X |
| 3,136,905 | 6/1964 | Zapf et al. | 319/87 |
| 3,304,878 | 2/1967 | Sabre | 415/72 UX |
| 3,422,766 | 1/1969 | Conibeer | 415/501 |
| 3,727,954 | 4/1973 | Oliver | 69/6 X |

Primary Examiner—D. F. Duggan
Attorney, Agent, or Firm—Shapiro and Shapiro

[57] ABSTRACT

A flexible submergible electric motor is provided which may be used in deviated deep wells. The motor comprises successive rigid sections flexibly interconnected by coupling means which permit relative angular adjustment of the adjacent sections without relative axial rotation.

5 Claims, 2 Drawing Figures

PATENTED JUL 30 1974    3,826,936
FIG. 1
FIG. 2
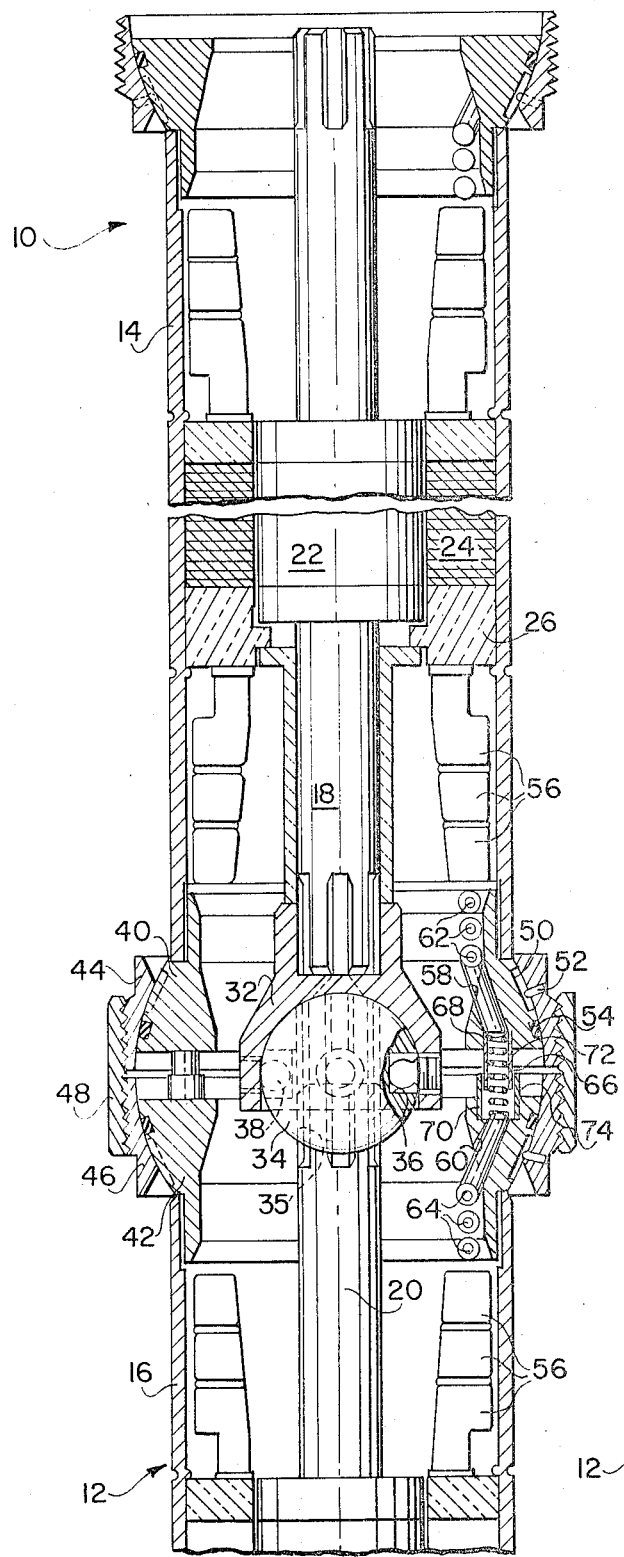
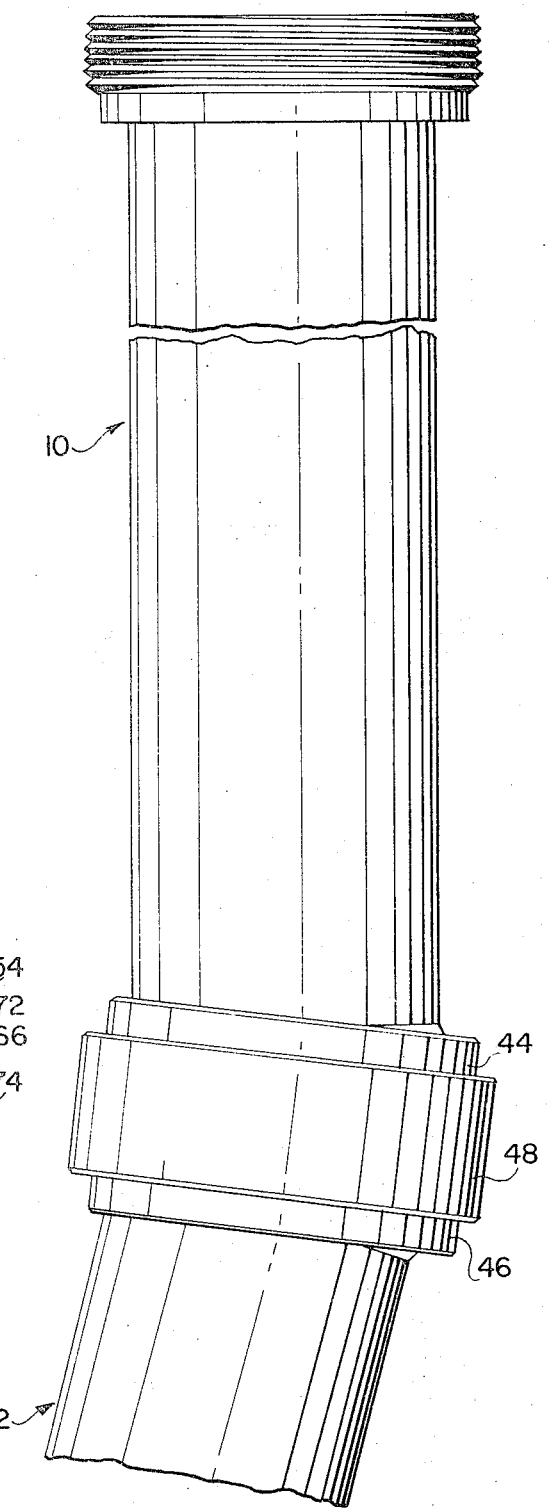

FLEXIBLE SUBMERGIBLE ELECTRIC MOTOR

BACKGROUND OF THE INVENTION

This invention relates to submergible electric motors and is more particularly concerned with submergible electric motors for use in deviated wells.

In the pumping of oil and other liquids from deep wells it is common practice to employ submergible electric motors for driving submergible pumps of the centrifugal type. Such motors comprise an elongated housing containing a rotary shaft along the axis thereof, the shaft having a rotor fixed thereto which cooperates with a stator fixed to the housing. See, for example, U.S. Pat. No. 2,315,917, granted to Arutunoff. When a large number of motor stages is required due, for example, to the depth of the well, it is common practice to provide separate motor sections which are bolted together, the rotary motor shafts being interconnected by splined couplings. See, for example, U.S. Pat. No. 2,098,958, granted to Ekstromer. However, the stacking of a large number of motor sections produces a rigid motor structure of great length, particularly when the length of the centrifugal pump fixed to one end of the motor is considered. Motors having lengths exceeding 50 or even 100 feet are not unusual. Such motors must be lowered into wells which may extend thousands of feet below the earth's surface, and if the well is deviated to an appreciable extent, it is difficult or impossible to lower the motor to the desired level within the well, particularly if the outer diameter of the motor is not considerably less than the inner diameter of the well casing.

SUMMARY OF THE INVENTION

It is accordingly an object of the present invention to provide improved submergible electric motors, and more particularly to provide flexible submergible electrical motors.

Another object of the invention is to provide improved submergible electric motors which may have lengths in excess of one hundred feet for use in severely deviated wells.

Briefly stated, the motor of the present invention employs elongated rigid motor sections of the submergible type which are interconnected flexibly in a simple manner to permit relative angular displacement of adjacent sections without appreciable relative axial rotation.

BRIEF DESCRIPTION OF THE DRAWINGS

The invention will be further described in conjunction with the accompanying drawings which illustrate a preferred and exemplary embodiment, and wherein:

FIG. 1 is a contracted longitudinal sectional view illustrating an electric motor in accordance with the invention and showing the flexible interconnection of adjacent motor sections; and FIG. 2 is a contracted elevation view of the motor of FIG. 1 but showing the adjacent motor sections angularly displaced with respect to each other.

DESCRIPTION OF THE PREFERRED EMBODIMENT

Referring to the drawings, a submergible electric motor in accordance with the invention comprises a plurality of motor sections, such as the sections 10 and 12, arranged in series. The motor sections comprise rigid housing sections 14 and 16 and rigid rotary motor shaft sections 18 and 20 supported by bearings within the corresponding housing sections so as to rotate about the axis thereof. Fixed to each motor section is a "squirrel cage" rotor 22 cooperable with a corresponding stator 24 fixed to the associated housing section. The rotor and stator are of known design, such as the type disclosed in U.S. Pat. No. 2,315,917 to Arutunoff, and the motor may be associated with a pump and auxiliary equipment as shown in that patent, for example. A stator ring 26 provides both radial and thrust bearings for the rotor. The motor is preferably oil-filled.

In a preferred embodiment of the invention, the motor sections are flexibly coupled by universal joints of the ball-and-socket type for permitting angular adjustment of each housing section and the associated shaft section relative to the adjacent housing sections and shaft sections, respectively, about orthogonal axes perpendicular to the axis of each shaft section but for restricting relative axial rotation of adjacent housing sections and of adjacent shaft sections, respectively. A socket 32 fixed to a splined end of shaft section 18 has a hemi-spherical cavity receiving a ball 34 fixed to the adjacent end of shaft section 20, the ball having a splined opening 35 therethrough receiving the splined end of shaft section 20. Equally spaced about the circumference of the ball in a plane perpendicular to the axis of shaft 20 are circular recesses 36 which receive the smaller-diameter spherical ends of pins 38 supported in threaded openings in the socket 32 for permitting limited universal angular movement of the ball in the socket, and thus limited relative angular displacement of the adjacent shaft sections, while preventing appreciable relative axial rotation of those sections.

Housing sections 14 and 16 have ball rings 40 and 42 threadedly connected thereto, respectively, each ball ring having a convex spherical surface portion. Socket rings 44 and 46, having concave spherical surface portions cooperable with the spherical surface portions of the ball rings, are connected together by a threaded connector ring 48 to maintain the cooperable spherical surfaces in slidable contact for permitting limited angular adjustment of the adjacent housing sections. Each ball ring is provided with four recesses 50 equally spaced about its circumference in a plane perpendicular to the axis of the associated housing section and receiving corresponding pins 52 projecting from the spherical surfaces of the socket rings, the dimensions of each recess exceeding the diameter of its associated pin for preventing appreciable relative axial rotation of the adjacent housing sections without unduly restricting relative angular movement of those sections. The ball rings 40 and 42 carry sealing rings 54 cooperable with the spherical surfaces of the socket rings for providing a water-tight or an oil-tight seal as desired.

For flexibly electrically interconnecting corresponding stator windings 56 of the successive motor sections, ball rings 40 and 42 include a plurality of aligned passages 58 and 60, respectively, (only one passage on each ring being shown) carrying insulated electrical conductors 62 and 64, respectively, the opposing ends of the conductors being flexibly electrically interconnected between the ball rings by an electrically conductive coil spring 66 having its opposite ends received by recesses 68 and 70 in communication with passages 58 and 60, respectively. Each spring is electrically insulated from the ball rings by a telescoping insulating joint comprising a first insulating sleeve 72 having one end mounted in recess 68 and having its other end loosely received by a second insulating sleeve 74 mounted in recess 70. The outside diameter of sleeve 72 is less than the inside diameter of sleeve 74 to avoid restricting relative angular movement of the adjacent housing sections.

As shown in FIG. 2, with the construction of the invention sufficient flexibility is provided in the electric motor to accommodate severely deviated deep wells, even when motor lengths of 100 feet or more are used, without radial thrust problems.

While a preferred embodiment of the invention has been shown and described, it will be apparent to those skilled in the art that changes can be made in this embodiment without departing from the principles and spirit of the invention, the scope of which is defined in the appended claims.

The invention claimed is:

1. A flexible submergible motor comprising a plurality of housing sections in series, each housing section having a rotary shaft section extending along the axis thereof, with a rotor fixed to each shaft section and with a cooperating stator fixed to each housing section, each shaft section and each housing section being rigid, and each shaft section being coupled to the adjacent shaft section and each housing section being coupled to the adjacent housing section by flexible coupling means for permitting angular adjustment of each housing section and the associated shaft section relative to the adjacent housing sections and shaft sections, respectively, but for restricting relative axial rotation of adjacent housing sections and of adjacent shaft sections, respectively.

2. A flexible motor in accordance with claim 1, wherein said coupling means comprises a universal joint.

3. A flexible motor in accordance with claim 2, wherein said universal joint comprises a ball-and-socket joint.

4. A flexible motor in accordance with claim 1, further comprising electrical conductors carried by said adjacent housing sections and wherein said coupling means comprises means for flexibly interconnecting the ends of said conductors between adjacent housing sections.

5. A flexible motor in accordance with claim 4, wherein said last-mentioned means comprises electrically conductive coil springs, and further comprising telescoping insulating joints for insulating said coil springs from said housing sections.

* * * * *